United States Patent
Powell

(10) Patent No.: US 9,708,789 B2
(45) Date of Patent: Jul. 18, 2017

(54) SOIL GAS EXTRACTION APPARATUS

(71) Applicant: Robert Brian Powell, San Tan Valley, AZ (US)

(72) Inventor: Robert Brian Powell, San Tan Valley, AZ (US)

(*) Notice: Subject to any disclaimer, the term of this patent is extended or adjusted under 35 U.S.C. 154(b) by 0 days.

(21) Appl. No.: 15/214,688

(22) Filed: Jul. 20, 2016

(65) Prior Publication Data
US 2017/0022683 A1    Jan. 26, 2017

Related U.S. Application Data

(60) Provisional application No. 62/194,411, filed on Jul. 20, 2015.

(51) Int. Cl.
*E02D 31/00* (2006.01)
*B09C 1/00* (2006.01)

(52) U.S. Cl.
CPC ............ *E02D 31/008* (2013.01); *B09C 1/005* (2013.01); *B09C 2101/00* (2013.01)

(58) Field of Classification Search
CPC ....... B09C 1/005; B09C 2101/00; B08B 5/04; B08B 5/02; E02D 31/008
USPC ........... 405/128.15, 128.2; 37/317, 321, 322, 37/323; 417/151, 196, 198
See application file for complete search history.

(56) References Cited

U.S. PATENT DOCUMENTS

| | | | | |
|---|---|---|---|---|
| 3,192,047 A * | 6/1965 | Moyle | ..................... | A23K 10/26 426/437 |
| 4,895,085 A * | 1/1990 | Chips | ..................... | B09C 1/005 110/236 |
| 5,087,175 A * | 2/1992 | Raizman | ..................... | F04F 5/20 417/196 |
| 5,169,293 A * | 12/1992 | Yamamoto | ............ | B01F 3/0876 210/758 |
| 6,000,151 A * | 12/1999 | Hayes | ..................... | E02F 3/9206 175/67 |
| 7,676,965 B1 * | 3/2010 | Nathenson | ............ | E02F 3/9206 37/317 |
| 2007/0079648 A1 * | 4/2007 | Chapman | ............ | G01M 3/2807 73/40 |
| 2008/0069640 A1 * | 3/2008 | Haemers | ................... | B09C 1/06 405/128.85 |
| 2015/0266068 A1 * | 9/2015 | Buckner | .............. | G01N 33/227 405/128.2 |

* cited by examiner

*Primary Examiner* — Benjamin Fiorello
*Assistant Examiner* — Carib OQuendo

(57) ABSTRACT

A soil gas extracting apparatus is used to vent hazardous soil gases out of the ground and into the atmosphere. The soil gas extracting apparatus makes use of a compressed air nozzle, a compressed air source, a vacuum-inducing tubular chamber, and a gas-receiving line to safely remove soil gases from the ground. The compressed air source forces air through the compressed air nozzle in order to generate a vacuum within the vacuum-inducing tubular chamber as the air flows into the gas-receiving line. The vacuum draws soil gases into the vacuum-inducing tubular chamber in order for the soil gases to be mixed with the air within the gas-receiving line and vented into the atmosphere.

17 Claims, 6 Drawing Sheets

SOIL GAS EXTRACTION APPARATUS

The current application claims a priority to the U.S. Provisional Patent application Ser. No. 62/194,411 filed on Jul. 20, 2015.

FIELD OF THE INVENTION

The present invention relates generally to an apparatus specifically designed to rapidly extract dangerous natural gas vapors out of the ground away from buildings and structures in a safe manner. More specifically, the present invention is a pneumatic venturi vacuum that removes the natural gas out of the ground.

BACKGROUND OF THE INVENTION

The present invention was designed for natural gas distribution companies. These companies transport natural gas through various types of pipelines and deliver the natural gas to homes and businesses. The pipelines are most typically buried underground in order to prevent tampering. These natural gas distribution companies have several gas leaks on their pipelines every year. Some of these leaks can be extremely hazardous to people and property if the leak occurs next to a structure. A large concentration of natural gas migrating underground can travel underneath buildings and structures and cause explosions that can damage buildings and infrastructures and injure people.

The present invention seeks to vent hazardous gas from the ground in order to prevent concentrations of natural gas to reach flammable or even explosive limits from leaking underground pipes. The present invention implements a compressed air source in order to generate a vacuum to remove the natural gas from the ground without the use of mechanical parts or sources of ignition along the natural gas fluid pathway. Therefore, the natural gas is able to be vented into the atmosphere safely and efficiently.

DETAIL DESCRIPTIONS OF THE INVENTION

All illustrations of the drawings are for the purpose of describing selected versions of the present invention and are not intended to limit the scope of the present invention.

The present invention is a soil gas extraction apparatus. The present invention allows a user to extract soil gases, in particular natural gas, from the ground. The soil gases are removed are removed through the use of compressed air in order to safely and efficiently vent hazardous soil gases into the atmosphere. By venting the hazardous soil gases, the present invention prevents the accumulation of the soil gases from leaking pipes from reaching a flammable or explosive concentration.

Figure 4:
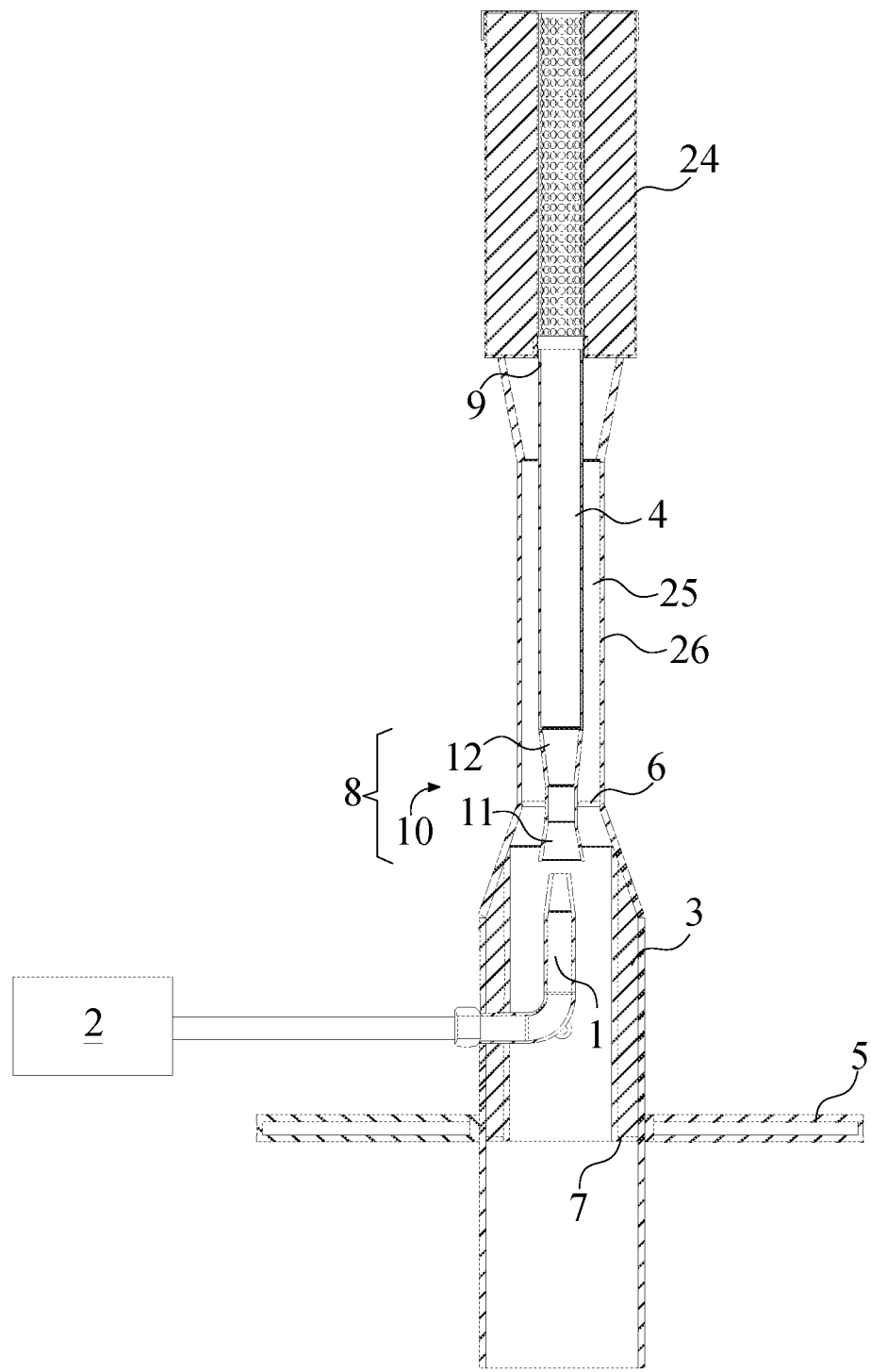
FIG. 4 is a cross-sectional view of the present invention along the line 3-3 from FIG. 2.

In accordance to FIG. 4, the present invention comprises a compressed air nozzle 1, a compressed air source 2, a gas-receiving line 4, a vacuum-inducing tubular chamber 3, and a ground-mounting base 5. The compressed air nozzle 1 allows for the flow of compressed air into the vacuum-inducing tubular chamber 3 and into the gas-receiving line 4 in order to generate a vacuum within the vacuum-inducing tubular chamber 3. The compressed air source 2 is in fluid communication with the compressed air nozzle 1 such that the compressed air source 2 provides a pressure difference for the compressed air to be able to flow through the compressed air nozzle 1. The compressed air source 2 is positioned outside of the vacuum-inducing tubular chamber 3 in order to ensure that any moving parts to compress the air are not in fluid communication with the soil gases such that the soil gases are not accidentally ignite. The compressed air nozzle 1 is positioned inside of the vacuum-inducing tubular chamber 3. The vacuum-inducing tubular chamber 3 allows for the extraction of soil gases from the ground by providing a vessel which a negative pressure, a pressure lower than atmospheric, may occur. The negative pressure from the flow of the compressed air between the compressed air nozzle 1 and into the gas-receiving line 4 drives the flow of natural gas from the ground into the vacuum-inducing tubular chamber 3 and subsequently into the gas-receiving line 4. The gas-receiving line 4 allows for the mixing of soil gases with the compressed air from the compressed air nozzle 1 in order to reduce the concentration of the soil gases as the soil gas is drawn from around the compressed air nozzle 1 and into the gas-receiving line 4. The ground-mounting base 5 is a flexible pad which supports the present invention on a ground surface and creates an air-tight seal with the ground when the present invention is implemented.

Figure 1:
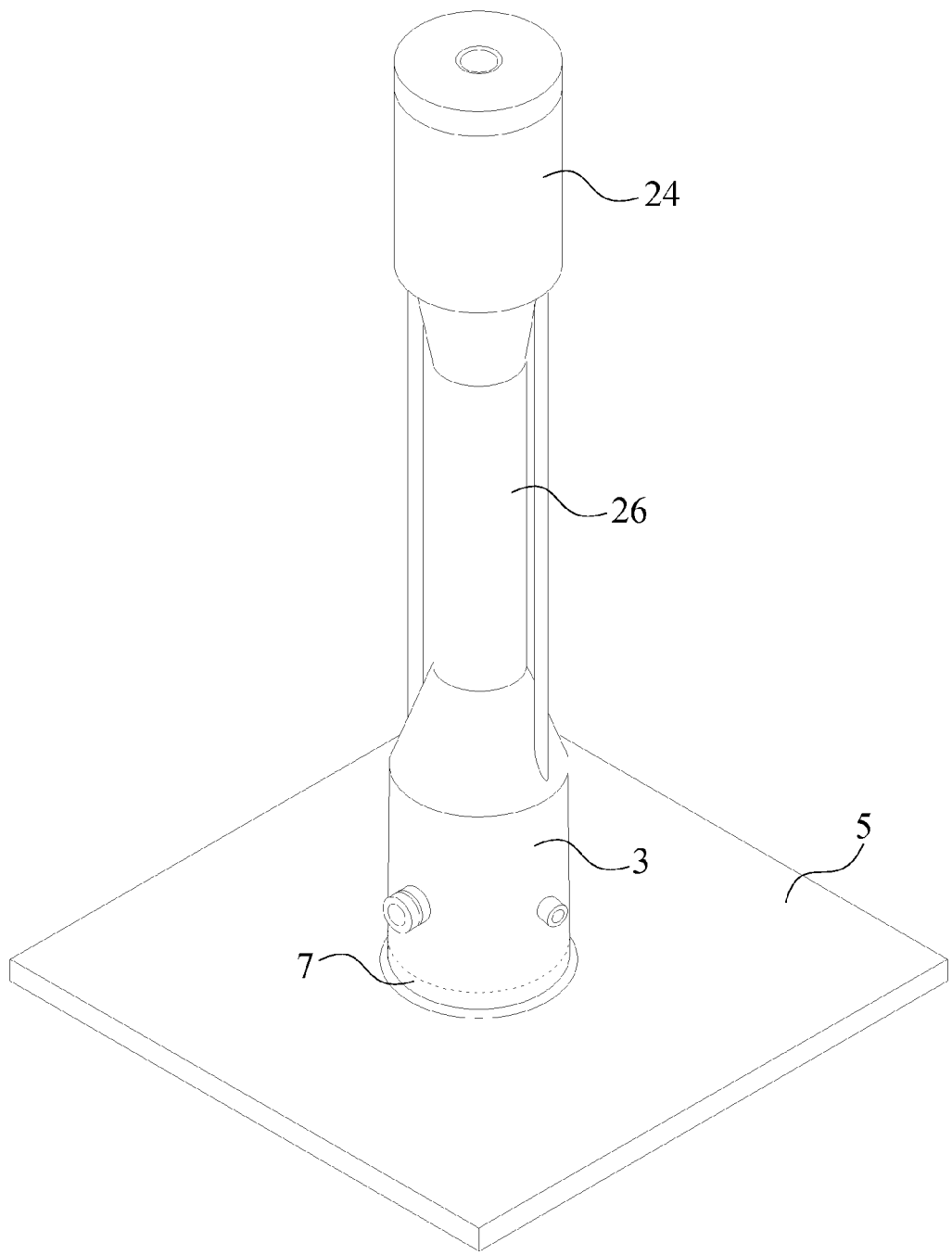
FIG. 1 is a perspective view of the present invention, wherein the present invention includes the insulation-retaining wall.

In accordance to the preferred embodiment of the present invention, the vacuum-inducing tubular chamber 3 comprises a closed tube end 6 and an open tube end 7. In implementation, the open tube end 7 is positioned adjacent to a borehole drilled into the ground in order to allow soil gases to be drawn into the vacuum-inducing tubular chamber 3. The borehole is a channel which is dug into the ground in order for the present invention to effectively draw soil gases from the ground. As shown in FIG. 1 and FIG. 4, the ground-mounting base 5 is peripherally connected about the open tube end 7, such that the vacuum-inducing tubular chamber 3 is supported perpendicularly on the ground surface. The gas-receiving line 4 traverses into the closed tube end 6 in order to allow fluid flow through the vacuum-inducing tubular chamber 3.

In accordance to FIG. 4, the gas-receiving line 4 comprises a line inlet 8 and a line outlet 9. The line inlet 8 receives the soil gas from the vacuum-inducing tubular chamber 3 as the soil gas is drawn into the flow of the compressed air as the compressed air travels from the compressed air nozzle 1 into the line inlet 8. The soil gas is mixed with the compressed air within the gas-receiving line 4 and the mixture of air and soil gas is vented through the line outlet 9. The line inlet 8 is positioned within the vacuum-inducing tubular chamber 3. The compressed air nozzle 1 is oriented towards the line inlet 8. This configuration allows the compressed air to draw the ambient gases within the vacuum-inducing tubular chamber 3 into the flow of air and into the line inlet 8. The line outlet 9 is positioned outside of the vacuum-inducing tubular chamber 3 such that the mixture of air and soil gas is exhausted from the present invention.

In accordance to the preferred embodiment of the present invention, the present invention comprises a convergent-divergent nozzle 10, as shown in FIG. 4. The convergent-divergent nozzle 10 increases the fluid velocity of the soil gas and the flow of air passing through the gas-receiving line 4 as the cross-sectional area of the convergent-divergent nozzle 10 decreases. The convergent-divergent nozzle 10 is integrated into the line inlet 8. The convergent-divergent nozzle 10 comprises a fluid-converging portion 11 and a fluid-diverging portion 12. The fluid-converging portion 11 is positioned adjacent to the compressed air nozzle 1 in order to receive the flow of the mixture of air and soil gas and increase the fluid velocity of the mixture as it passes through the fluid-converging portion 11. Increasing the fluid velocity for the flow of the mixture of air and soil gas through the gas-receiving line 4 allows for the negative pressure to be present around the compressed air nozzle 1 as the surrounding fluid is drawn into the stream for the mixture of air and soil gas. The fluid-diverging portion 12 is positioned adjacent to the fluid-converging portion 11, opposite to the compressed air nozzle 1. The fluid-diverging portion 12 increases the cross-sectional area along the direction of fluid flow in order to allow the mixture of air and soil gas to decrease in velocity to be vented to the atmosphere at a rate equivalent to the flow rate for the flow of air out of the compressed air nozzle 1.

Figure 2:
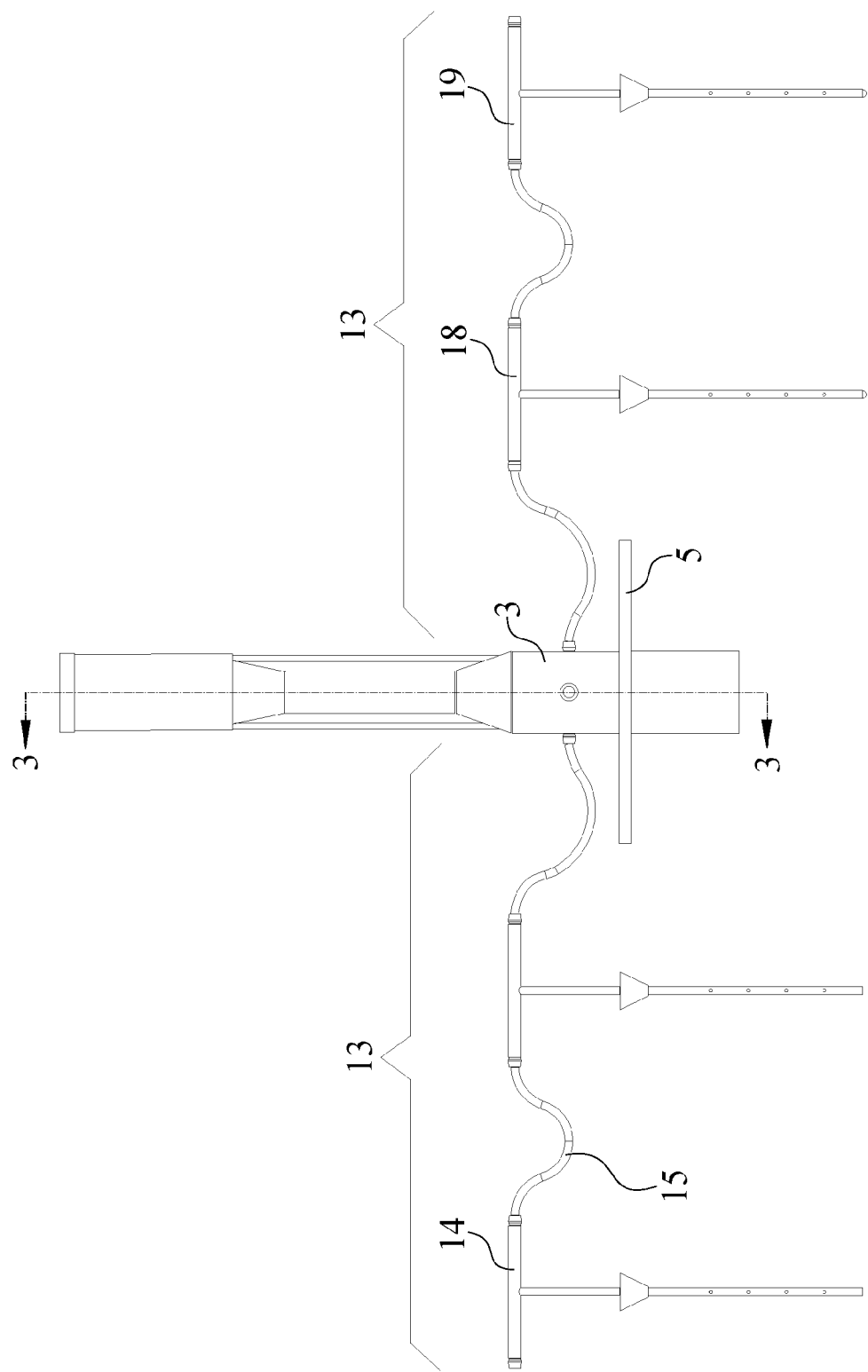
FIG. 2 is a schematic view for the present invention, wherein the at least vacuum-extending units includes an inner unit and an outer unit.

In some embodiments of the present invention, the present invention comprises at least one vacuum-extending unit 13, as shown in FIG. 2. The vacuum-extending units expand the area which the present invention is able to extract soil gases. Each of the at least one vacuum-extending unit 13 comprises a probe 14 and a vacuum hose 15. The probe 14 is inserted into the ground in order to extract soil gases in a radius around the vacuum-inducing tubular chamber 3, wherein the radius is the length of the vacuum hose 15. The vacuum hose 15 allows for the transfer of soil gases from the probe 14 to the vacuum-inducing tubular chamber 3. Consequently, the probe 14 is in fluid communication with the vacuum-inducing tubular chamber 3 through the hose.

Figure 5:
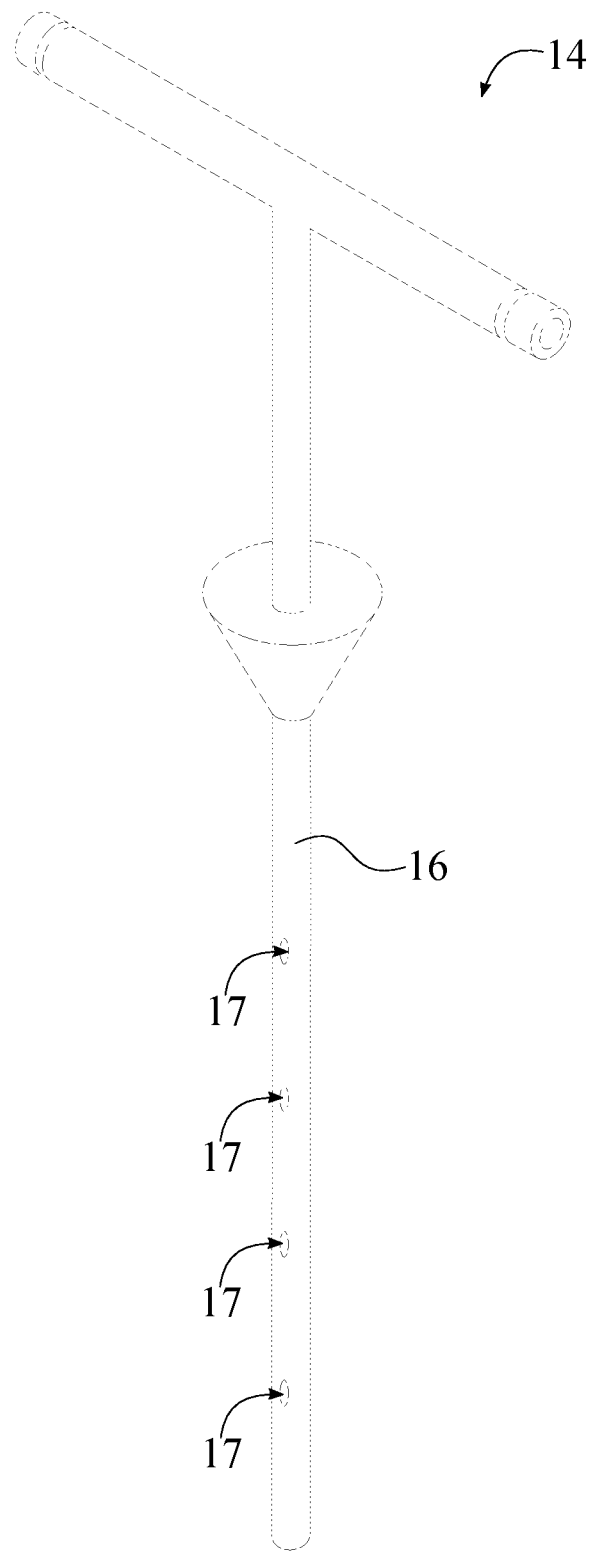
FIG. 5 is a detailed view for a probe of the present invention.

In accordance to FIG. 5, the probe 14 comprises a ground-insertion tube 16 and a plurality of intake orifices 17. The ground-insertion tube 16 allows the probe 14 to be efficiently inserted into the ground. The plurality of intake orifices 17 allows soil gases to pass into the probe 14 efficiently. The plurality of intake orifices 17 laterally traverses into the ground-insertion tube 16. The plurality of intake orifices 17 is evenly distributed along the ground-insertion tube 16. The ground-insertion tube 16 is hermetically connected to the vacuum hose 15 in order to prevent head loss for the flow of soil gases. The ground-insertion tube 16 is oppositely positioned to the vacuum-inducing tubular chamber 3 along the vacuum hose 15. The plurality of intake orifices 17 is in fluid communication with the vacuum hose 15. This configuration allows for soil gases to easily flow into the ground-insertion tube 16 from the surrounding ground about which the ground-insertion tube 16 is placed during implementation to be extracted through the vacuum-inducing tubular chamber 3.

Figure 3:
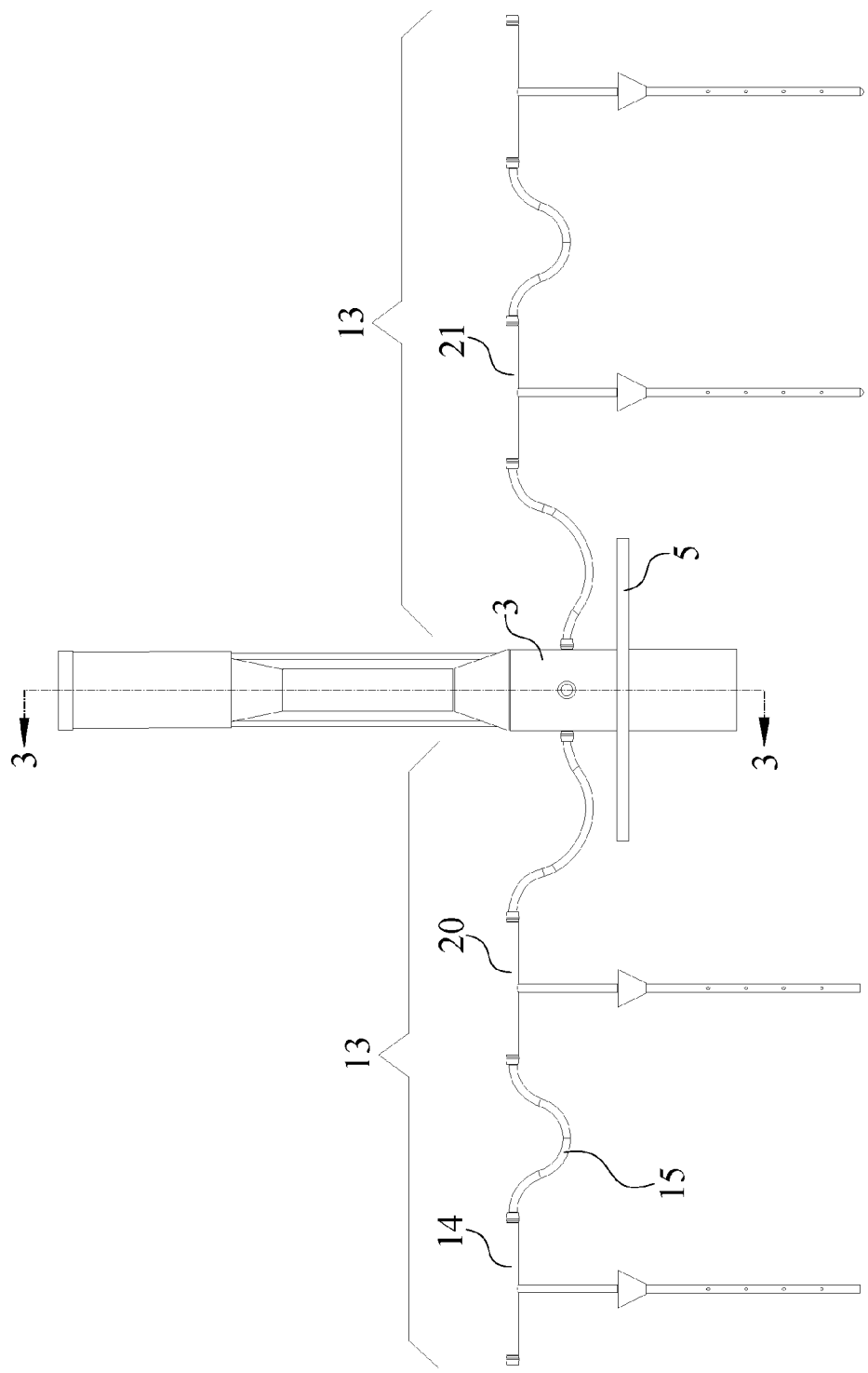
FIG. 3 is a schematic view for the present invention, wherein the at least vacuum-extending units includes a first unit and a second unit.

In some embodiments of the present invention, the at least one vacuum-extending unit 13 is multiple vacuum-extending units may be combine in order to expand the effective area of the present invention to extract soil gases. In one embodiment, the at least one vacuum-extending unit 13 comprises an inner unit 18 and an outer unit 19, as shown in FIG. 2. The inner unit 18 and the outer unit 19 allow the user to extend the distance which the user is able to extract soil gases relative to the vacuum-inducing tubular chamber 3. The inner unit 18 is in direct fluid communication with the vacuum-inducing tubular chamber 3. The outer unit 19 is in indirect fluid communication with the vacuum-inducing tubular chamber 3 through the inner unit 18. This configuration allows the outer unit 19 to be positioned farther from the vacuum-inducing tubular chamber 3 as the outer unit 19 is tethered to the vacuum-inducing tubular chamber 3 through the inner unit 18. In another embodiment of the present invention, the at least one vacuum-extending unit 13 comprises a first unit 20 and a second unit 21, as detailed in FIG. 3. The first unit 20 and the second unit 21 are diametrically opposed to each other about the vacuum-inducing tubular chamber 3. This allows the present invention to extract soil gases from multiple points within the radius of the vacuum-inducing tubular chamber 3, wherein the radius is approximately the length of the vacuum hose 15. The aforementioned embodiments are able to be combined in order to further expand the effective area which the present invention is able to extract soil gases.

Figure 6:
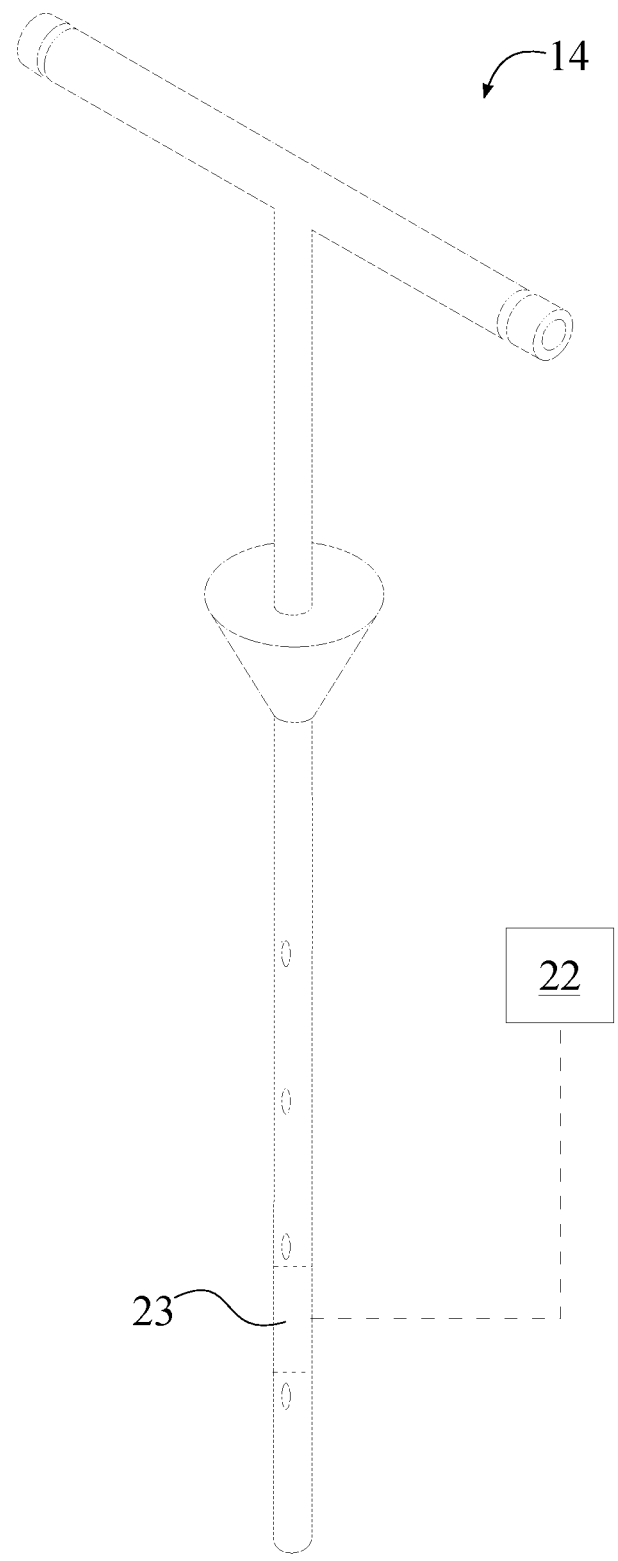
FIG. 6 is a detailed view for a probe of the present invention, wherein the probe includes a hazardous gas sensor.

In some embodiments of the present invention, the present invention comprises a computing device 22, and each of the at least one vacuum-extending unit 13 further comprises a hazardous gas sensor 2, in accordance to FIG. 6. The computing device 22 translates the signal from the hazardous gas sensor 23 into discrete data for the user to assess the concentration of hazardous gases within the soil. The hazardous gas sensor 23 is mounted to the probe 14. The hazardous gas sensor 23 from each of the at least one vacuum-extending unit 13 is communicatively coupled with the computing device 22 such that the computing device 22 receives signals from each hazardous gas sensor 23. This configuration allows the present invention to assess the concentration of hazardous gases within the soil around the vacuum-inducing tubular chamber 3 during implementation of the present invention.

Due to the high velocities of fluid flow to generate sufficient suction through the present invention, the present invention is easily audible. In order to reduce the sound produced by the present invention, some embodiments of the present invention further comprise a muffler 24, as shown in FIG. 1 and FIG. 4. The muffler 24 reduces the exit velocity or manipulates the flow of the mixture of air and soil gas in order to reduce the noise produced by the flow of the mixture of air and soil gas. In accordance to FIG. 4, the muffler 24 is in fluid communication with the line outlet 9 in order for the flow of the mixture of air and soil gas through the muffle 24. The muffler 24 is removably mounted adjacent to the gas-receiving line 4, opposite to vacuum-inducing tubular chamber 3 in order to manipulate the exit velocity or flow profile out from the present invention. The muffler 24 is able to be removed to allow the user to easily clean the muffler 24, the gas-receiving line 4, and the vacuum-inducing tubular chamber 3 from any dirt or debris that is fluidized by the difference of pressure into the present invention. Additionally, in some embodiments of the present invention, the present invention comprises a sound-insulation barrier 25 and an insulation-retaining wall 26 to assist in reducing the noise produced by the present invention. The sound-insulation barrier 25 externally envelopes the gas-receiving line 4 in order to dampen the sound produced by the flow of the mixture of air and soil gas through the gas-receiving line 4. The insulation-retaining wall 26 encloses the sound-insulation barrier 25, and the sound-insulation barrier 25 and the insulation-retaining wall 26 are positioned adjacent to the closed tube end 6 in order to support the sound-insulation barrier 25 against the gas-receiving line 4.

Although the invention has been explained in relation to its preferred embodiment, it is to be understood that many other possible modifications and variations can be made without departing from the spirit and scope of the invention as hereinafter claimed.

What is claimed is:

1. A soil gas extraction apparatus comprises:
a compressed air nozzle;
a compressed air source;
a vacuum-inducing tubular chamber;
a gas-receiving line;
a ground-mounting base;
the vacuum-inducing tubular chamber comprises a closed tube end and an open tube end;
the gas-receiving line comprises a line inlet and a line outlet;
the compressed air source being positioned outside of the vacuum-inducing tubular chamber;
the compressed air nozzle being positioned inside of the vacuum-inducing tubular chamber;
the compressed air source being in fluid communication with the compressed air nozzle;
the gas-receiving line traversing into the closed tube end;
the line inlet being positioned inside of the vacuum-inducing tubular chamber;
the line outlet being positioned outside of the vacuum-inducing tubular chamber;
the compressed air nozzle being oriented towards the line inlet; and
the ground-mounting base being peripherally connected about the open tube end.

2. The soil gas extraction apparatus, as claimed in claim 1, comprises:
a convergent-divergent nozzle;
the convergent-divergent nozzle comprises a fluid-converging portion and a fluid-diverging portion;
the convergent-divergent nozzle being integrated into the line inlet;
the fluid-converging portion being positioned adjacent to the compressed air nozzle; and
the fluid-diverging portion being positioned adjacent to the fluid-converging portion, opposite to the compressed air nozzle.

3. The soil gas extraction apparatus, as claimed in claim 1, comprises:
at least one vacuum-extending units;
each of the at least one vacuum-extending units comprises a probe and a vacuum hose; and
the probe being in fluid communication with the vacuum-inducing tubular chamber through the vacuum hose.

4. The soil gas extraction apparatus, as claimed in claim 3, comprises:
the probe comprises a ground-insertion tube and a plurality of intake orifices;
the plurality of intake orifices laterally traversing into the ground-insertion tube;
the plurality of intake orifices being evenly distributed along the ground-insertion tube;
the ground insertion tube being hermetically connected to the vacuum hose;
the ground insertion tube being oppositely positioned to the vacuum-inducing tubular chamber, along the vacuum hose; and
the plurality of intake orifices being in fluid communication with the vacuum hose.

5. The soil gas extraction apparatus, as claimed in claim 3, comprises:
the at least one vacuum-extending units comprises an inner unit and an outer unit;
the inner unit being in direct fluid communication with the vacuum-inducing tubular chamber; and
the outer unit being in indirect fluid communication with the vacuum-inducing tubular chamber through the inner unit.

6. The soil gas extraction apparatus, as claimed in claim 3, comprises:
the at least one vacuum-extending units comprises a first unit and a second unit; and
the first unit and the second unit being diametrically opposed to each other about the vacuum-inducing tubular chamber.

7. The soil gas extraction apparatus, as claimed in claim 3, comprises:
a computing device;
each of the at least one vacuum-extending units further comprises a hazardous gas sensor;
the hazardous gas sensor being mounted to the probe; and
the hazardous gas sensor from each of the at least one vacuum-extending units being communicatively coupled with the computing device.

8. The soil gas extraction apparatus, as claimed in claim 1, comprises:
a muffler;
the muffler being in fluid communication with the line outlet; and
the muffler being removably mounted adjacent to the gas-receiving line, opposite to the vacuum-inducing tubular chamber.

9. The soil gas extraction apparatus, as claimed in claim 1, comprises:
a sound-insulation barrier;
an insulation-retaining wall;
the sound-insulation barrier externally enveloping the gas-receiving line;
the insulation-retaining wall enclosing the sound-insulation barrier; and
the sound-insulation barrier and the insulation-retaining wall being positioned adjacent to the closed tube end.

10. A soil gas extraction apparatus comprises:
a compressed air nozzle;
a compressed air source;
a vacuum-inducing tubular chamber;
a gas-receiving line;
a ground-mounting base;
at least one vacuum-extending units;
the vacuum-inducing tubular chamber comprises a closed tube end and an open tube end;
the gas-receiving line comprises a line inlet and a line outlet;
each of the at least one vacuum-extending units comprises a probe and a vacuum hose;
the compressed air source being positioned outside of the vacuum-inducing tubular chamber;
the compressed air nozzle being positioned inside of the vacuum-inducing tubular chamber;
the compressed air source being in fluid communication with the compressed air nozzle;
the gas-receiving line traversing into the closed tube end;
the line inlet being positioned inside of the vacuum-inducing tubular chamber;

the line outlet being positioned outside of the vacuum-inducing tubular chamber;

the compressed air nozzle being oriented towards the line inlet;

the ground-mounting base being peripherally connected about the open tube end; and the probe being in fluid communication with the vacuum-inducing tubular chamber through the vacuum hose.

11. The soil gas extraction apparatus, as claimed in claim 10, comprises:

a convergent-divergent nozzle;

the convergent-divergent nozzle comprises a fluid-converging portion and a fluid-diverging portion;

the convergent-divergent nozzle being integrated into the line inlet;

the fluid-converging portion being positioned adjacent to the compressed air nozzle; and the fluid-diverging portion being positioned adjacent to the fluid-converging portion, opposite to the compressed air nozzle.

12. The soil gas extraction apparatus, as claimed in claim 10, comprises:

the probe comprises a ground-insertion tube and a plurality of intake orifices;

the plurality of intake orifices laterally traversing into the ground-insertion tube;

the plurality of intake orifices being evenly distributed along the ground-insertion tube;

the ground insertion tube being hermetically connected to the vacuum hose;

the ground insertion tube being oppositely positioned to the at least one probe inlet, along the vacuum hose; and the plurality of intake orifices being in fluid communication with the vacuum hose.

13. The soil gas extraction apparatus, as claimed in claim 10, comprises:

the at least one vacuum-extending units comprises an inner unit and an outer unit;

the inner unit being in direct fluid communication with the vacuum-inducing tubular chamber; and the outer unit being in indirect fluid communication with the vacuum-inducing tubular chamber through the inner unit.

14. The soil and gas extraction apparatus, as claimed in claim 10, comprises:

the at least one vacuum-extending units comprises a first unit and a second unit; and the first unit and the second unit being diametrically opposed to each other about the vacuum-inducing tubular chamber.

15. The soil gas extraction apparatus, as claimed in claim 10, comprises:

a computing device;

each of the at least one vacuum-extending units further comprises a hazardous gas sensor;

the hazardous gas sensor being mounted to the probe; and the hazardous gas sensor from each of the at least one vacuum-extending units being communicatively coupled with the computing device.

16. The soil gas extraction apparatus, as claimed in claim 10, comprises:

a muffler;

the muffler being in fluid communication with the line outlet; and the muffler being removably mounted adjacent to the gas-receiving line, opposite to the vacuum-inducing tubular chamber.

17. The soil gas extraction apparatus, as claimed in claim 10, comprises:

a sound-insulation barrier;

an insulation-retaining wall;

the sound-insulation barrier externally enveloping the gas-receiving line;

the insulation-retaining wall enclosing the sound-insulation barrier; and the sound-insulation barrier and the insulation-retaining wall being positioned adjacent to the closed tube end.

* * * * *